Feb. 13, 1923. Re. 15,538
E. H. COLPITTS
CONTROL DEVICE FOR WIRELESS SIGNALING
Original Filed Sept. 19, 1916
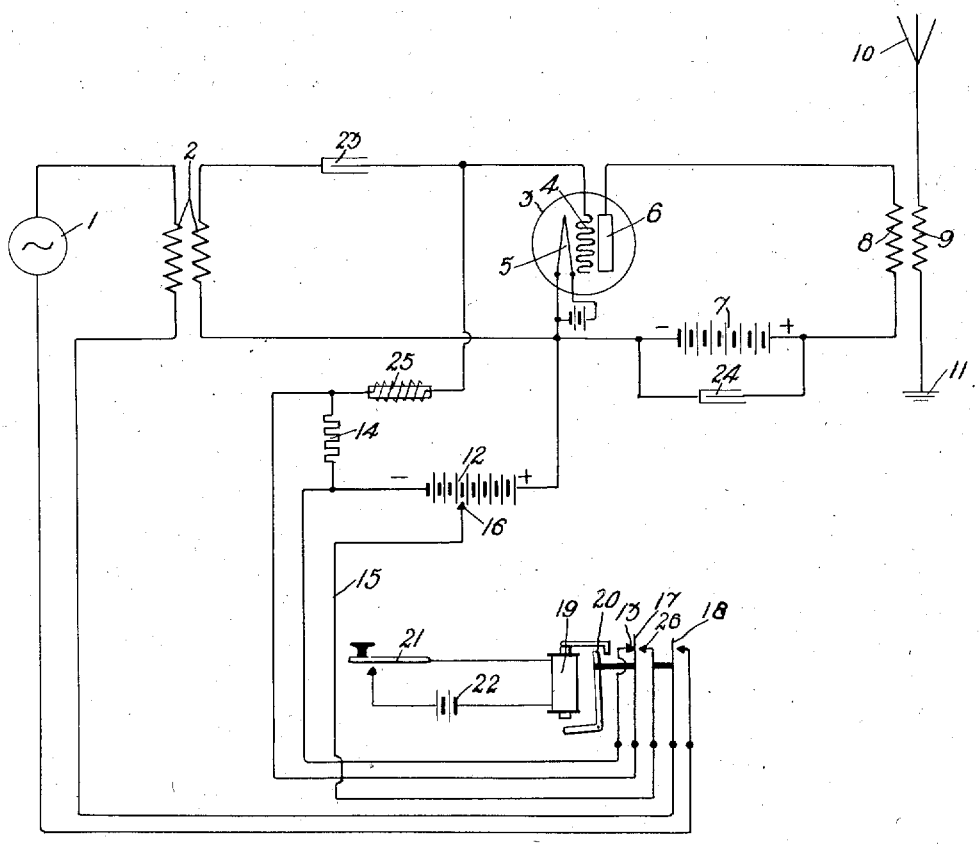
Inventor:
Edwin H. Colpitts.
by J. G. Roberts Att'y.

Reissued Feb. 13, 1923. Re. 15,538

UNITED STATES PATENT OFFICE.

EDWIN H. COLPITTS, OF EAST ORANGE, NEW JERSEY, ASSIGNOR, BY MESNE ASSIGNMENTS, TO WESTERN ELECTRIC COMPANY, INCORPORATED, A CORPORATION OF NEW YORK.

CONTROL DEVICE FOR WIRELESS SIGNALING.

Original No. 1,198,699, dated September 19, 1916, Serial No. 50,171, filed Septembr 11, 1915. Application for reissue filed February 14, 1918. Serial No. 217,236.

*To all whom it may concern:*

Be it known that I, EDWIN H. COLPITTS, a subject of the King of Great Britain, residing at East Orange, in the county of Essex and State of New Jersey, have invented certain new and useful Improvements in Control Devices for Wireless Signaling, of which the following is a full, clear, concise, and exact description.

This invention relates to the control, for signaling and other purposes, of a large current obtained from the output circuit of a thermionic amplifier.

The object is to reduce the power consumption to a minimum or small value and to obtain a maximum output from a given amount of apparatus.

The results are obtained by so arranging the circuit that the space current flows in the amplifier tubes only during the time that signal impulses are being sent. This might be accomplished by making and breaking the output or high power circuit of the amplifier, but this involves the interruption or breaking of a circuit in which a large current at a high potential may be flowing. The desired result can be obtained better by an arrangement by means of which the voltage of the battery in the input or grid circuit has such a value that the space current, that is, the current in the output circuit, is made very small. In other words, provision is made whereby the voltage applied to the grid or input circuit of the amplifier is changed at the instant of signaling from such a value as causes a minimum energy loss in the output circuit to a value which permits of normal flow of current in the said circuit. This may be accomplished in a variety of ways and very readily for the reason that the normal power absorbed in the input circuit of a thermionic amplifier is very small.

The figure of the drawing shows one arrangement of circuits by which the desired result is obtained.

Referring to the figure, 1 represents a generator of high frequency oscillations of low power, which is connected to the primary of a transformer 2; the secondary of said transformer being connected to the input circuit of a thermionic amplifier 3; the electrode 5 of said amplifier being the heated element and the electrode 4 being the usual grid. The output circuit is connected from the plate electrode 6 through the inductance 8, the battery 7 and the filament 5. For signaling purposes, the inductance 8 is inductively connected to the inductance 9, which in turn is connected to the signaling system. This signaling system may consist of any wire system or may be used for space telegraphy as shown in the figure, in which 10 represents the elevated antenna or other suitable radiating system and 11 represents the usual earth connection for such a system.

Connected to the input terminals of the amplifier and in parallel to the secondary of the transformer 2 is a circuit containing a battery 12, which is the usual battery for determining the potential applied between the electrodes 4 and 5. In this invention, battery 12 has a sufficiently high voltage to reduce the space current flowing between the electrodes 6 and 5, from the battery 7, to a zero or a relatively small value. In order to transmit signaling currents, it is necessary to reduce the voltage impressed on the input circuit sufficiently to permit the flow of the normal space current. In order to accomplish this the following arrangement has been found useful: A switch or key 13 is placed in the circuit of the battery, and a large resistance 14 of several thousand ohms or more is placed in shunt to this key. A conductor 15 leads from some intermediate point 16 of the battery 12, the free end of said conductor 15 being placed in juxtaposition to the spring terminal 17, which also forms one terminal of the switch 13. It has been found desirable also, but not necessary, to place a key or switch 18 in the circuit of the high frequency generator. The compound key or switch may be operated by hand directly or indirectly by means of the magnet or relay 19. The armature 20 is rigidly secured to the operating portions of the switch. This relay 19 may in turn be operated by means of the key 21, which closes a circuit containing the said key, battery 22 and the winding of the relay. In the circuit of the secondary of the transformer 2 is placed condenser 23.

A similar condenser 24 is placed in shunt to the battery 7. A choke coil 25 is placed in the circuit of the battery 12.

The operation of the system is as follows: When no signals are being transmitted, the switch 13 is closed, thereby short-circuiting the high resistance 14 and permitting the voltage of the whole battery 12 to be impressed on the input circuit of the amplifier. This battery is of sufficient voltage to prevent the flow of an appreciable space current between the electrodes 5 and 6. Upon closing the key 21, the switch 13 is opened and the member 17 is moved to make contact with the terminal 26 and also to close the switch at 18. This operation brings the point 16 of the battery 12 into electrical connection with the terminal 4 of the amplifier. Conductor 15 is placed at such a point 16 of the battery that the voltage, which is now impressed on the input circuit of the amplifier, is sufficiently small to permit the normal flow of space current through the amplifier. At the same time the closing of the switch 18 permits the transfer of high frequency, low power oscillations into the input circuit of the amplifier. The whole operation results in a flow of amplified high frequency oscillations in the output circuit of the amplifier.

The purpose of the high resistance 14 is to prevent that portion of the battery 12, which is not used when signaling, from being short-circuited. The condenser 23 is to prevent the discharge of the battery 12 through the secondary of the transformer 2, and the choke coil 25 is inserted in order to prevent the discharge of the high frequency oscillations from the transformer through the battery circuit. The condenser 24 is used to afford a path of low impedance for the high frequency oscillations around the battery 7 and also to form a short circuit for transient high frequency disturbances in the battery 7.

For simplicity, this invention has been described and shown for one amplifying tube only. It is to be understood, however, that in general one such tube will not supply sufficient power for radio telegraphy, and for this reason there will in general be a large number of such tubes connected in parallel in any suitable manner, such, for example, as is shown in patent to Arnold, No. 1,129,943, March 2, 1915.

It is obvious that the method is not limited to simple hand sending, but can be employed whenever the sending of signals involves an interrupted ouput.

It is to be understood that while I have shown and described this invention as applied to a signaling system, it is not to be so limited as to its application, for it is apparent that the invention may be used in any place where it is desired to alternately change the output of such an amplifier as shown from a minimum to a maximum value, or the reverse.

What is claimed is:

1. In a system for amplifying weak impulses, an amplifier of the audion type, the output circuit of which is adapted to carry a space current; a source of voltage connected to the input circuit of said amplifier; a circuit for supplying said weak impulses to the said input circuit, and means to control the impression of said impulses on the input circuit, said means being adapted to vary the amount of voltage of said source impressed upon the input circuit of the amplifier whereby the space current is reduced to a small valve when the weak impulses are not impressed.

2. In a high frequency signal transmitting system, an amplifier having an input and an output circuit; a source of voltage connected to the input circuit of said amplifier; a circuit for supplying high frequency oscillations of low power to said input circuit, and signaling means adapted to vary the amount of voltage of the said source impressed upon the input circuit of the amplifier, whereby the output current is reduced to a small value when no signals are being transmitted.

3. In a high frequency signaling system, a generator of high frequency oscillations of low power; an amplifier having an input and an output circuit, said generator being connected to the input circuit of the amplifier; a source of voltage connected to the input circuit of the amplifier, said source having sufficient voltage to reduce the output current of the amplifier to a small value and signaling means for reducing the voltage of the source impressed on the input circuit of the amplifier, when signaling, to permit a large output current.

4. In a high frequency signaling system, a generator of high frequency oscillations of low power; a thermionic amplifier of the audion type. said generator being connected to the input circuit of the amplifier; a battery connected to the input circuit of the amplifier and a switch adapted, when not signaling, to impress the whole battery voltage upon the input circuit of the amplifier, whereby the space current is reduced to a small value and adapted, when signaling, to impress a portion only of said battery voltage upon the input circuit of the amplifier.

5. In a high frequency signaling system, a generator of high frequency oscillations of low power; a thermionic amplifier of the audion type, said generator being connected to the input circuit of the amplifier; a battery connected to the input circuit of the amplifier and in parallel to the generator and a switch adapted, when not signaling, to impress the whole battery voltage upon the input circuit of the amplifier, whereby the space current is reduced to a minimum and adapted, when signaling, to impress a portion only of said battery voltage upon the input circuit of the amplifier.

6. In a high frequency signaling system, a generator of high frequency oscillations of low power; a thermionic amplifier of the audion type; a battery; said generator and battery being connected to the input circuit of the amplifier and a switch adapted, when signaling, to impress a portion only of said battery voltage upon the input circuit of the amplifier and to close the generating circuit, and adapted, when not signaling, to open the generator circuit and to impress the whole battery voltage upon the input circuit of the amplifier, whereby the space current in the amplifier is reduced to a minimum when not transmitting signals.

7. In a high frequency signaling system, a generator of high frequency oscillations of low power; a thermionic amplifier of the audion type, said generator being connected to the input circuit of the amplifier; a battery connected to the input circuit of the amplier and in parallel to the generator, and a switch adapted, when signaling, to impress a portion only of said battery on the input circuit of the amplifier and to close the generator circuit and adapted, when not signaling, to open the generator circuit and to impress the whole battery voltage upon the input circuit of the amplifier, whereby the space current in the amplifier is reduced to a minimum when not transmitting signals.

8. In a high frequency signaling system, a generator of high frequency oscillations of low power; a thermionic amplifier of the audion type, said generator being connected to the input circuit of the amplifier; a battery connected to the input circuit of the amplifier and in parallel to the generator and a magnetically operated switch adapted, when signaling, to shunt a portion of the battery, to impress the remainder of said battery voltage upon the input circuit of the amplifier and to close the generator circuit, and adapted, when not signaling, to open the generator circuit and to impress the whole battery voltage upon the input circuit of the amplifier, whereby the space current in the amplifier is reduced to a minimum when not transmitting signals.

9. In a high frequency signaling system, a generator of high frequency oscillations of low power; a thermionic amplifier of the audion type, said generator being connected to the input circuit of the amplifier; a battery connected to the input circuit of the amplifier and in parallel to the generator; a choke coil and a resistance in series with said battery and a magnetically operated switch adapted, when signaling, to shunt a portion of said battery through said resistance, to impress the remainder of said battery upon the input circuit of the amplifier and to close the generator circuit, and adapted, when not signaling, to open the generator circuit, to short circuit the resistance and to impress the whole battery upon the input circuit of the amplifier, whereby the space current in the amplifier is reduced to a minimum when not transmitting signals.

10. In a high frequency signaling system, a generator of high frequency oscillations of low power; a thermionic amplifier of the audion type; a condenser; a transformer, the primary of which is in the generator circuit and the secondary of which is connected, in series through the condenser, to the input circuit of said amplifier; a battery connected to the input circuit and in parallel to the secondary of the transformer; a choke coil and a resistance in series with said battery, and a magnetically operated switch adapted, when signaling, to open the short circuit, to shunt a portion of said battery through said resistance, to impress the remainder of said battery on the input circuit of the amplifier and to close the generator circuit, and adapted, when not signaling, to short circuit the resistance in series with said battery and to open the generator circuit, whereby the space current in the amplifier is reduced to a minimum when not transmitting.

11. A signaling system comprising a source of signals, a vacuum tube comprising electrodes, direct current means for supplying space current between said electrodes, an electrode for controlling said space current, means for applying to said controlling electrode a direct current potential sufficient to reduce said space current to a small value and means dependent upon the transmission of signals for changing the direct current potential of said electrode in addition to the signaling potential.

12. A signaling system comprising electrodes, means for supplying a space current therebetween, a source of signals, an electrode for controlling said current, a battery adapted to assign a potential to said control electrode, and means responsive to the cessation of signals for controlling the connection of said battery to said electrode.

13. In a system of radio communication, a thermionic device having an input circuit and an output circuit, a source of space current for the output circuit thereof, a source of carrier impulses and a source of signal impulses connected to the input circuit of said device, means for automatically reducing the space current substantially to zero when said carrier and signal impulses are of substantially zero amplitude and a translating circuit associated with the output circuit of said device.

14. A signaling system comprising a vacuum tube for repeating in substantially the same wave form alternating current waves impressed thereon, said tube having an anode, a cathode and a control electrode, means for supplying space current between said anode and cathode, means for rendering said tube inoperative, and means dependent upon the transmission of signals for applying a potential, other than the signaling potential, to said control electrode to render said tube operative.

15. In combination a vacuum tube amplifier having an anode, a cathode, and a control electrode, an input circuit and an output circuit for said tube, a source of direct current potential connected between said anode and said cathode, an alternating current source of signals, means for impressing said signals from said source upon said input circuit, said tube having a permanent zero space current in the absence of signals from said source, an outgoing line, means for impressing the alternating current signals in said output circuit on said line without substantial distortion, and means responsive to an impressed electric impulse for establishing the space current of said tube.

16. In combination a vacuum tube amplifier for repeating in substantially the same wave form signals impressed thereon, said tube having an anode, a cathode, and a control electrode, an input and an output circuit for said tube, a source of alternating current of ultra-audio frequency, a source of voltage for maintaining said control electrode at a negative potential with respect to said cathode in the absence of signals from said source, means for impressing signals from said source upon the input circuit of said tube, said tube being permanently inoperative in the absence of signals from said source, an outgoing line, means for impressing the alternating current signals in said output circuit upon said line without substantial distortion and means responsive to an impressed electric impulse for rendering said tube operative.

17. A space current repeater device comprising a control electrode, direct current means tending to supply a space current for said device, means tending to prevent said space current from being supplied, said means being so related that said space current is substantially zero, means for supplying signals to said device means for varying the effectiveness of one of said first two mentioned means in response to a received wave, an outgoing line and means for impressing the variations of the space current of said tube produced by said signals upon said line without substantial distortion.

18. The method of signaling in which a vacuum tube is employed having a space current between two electrodes and a third electrode for controlling said current, which method comprises providing for said control electrode a direct current potential of sufficient value to reduce said space current substantially to zero and subsequently impressing a direct current potential of a different value upon said control electrode whereby said space current is established.

19. A signaling system comprising a vacuum tube having an anode, a cathode, and a control electrode, a source of direct current potential for supplying space current to said tube, a plurality of shunt paths between said control electrode and said cathode, means for impressing signals upon one of said shunt paths, and means in another of said paths for reducing said space current substantially to zero in the absence of signals.

20. A signaling system comprising a vacuum tube having an anode, a cathode, and a control electrode, a source of direct current potential for supplying space current to said tube, a source of signals, two shunt paths between said control electrode and said cathode, means for impressing said signals upon one of said shunt paths, means for causing said tube to have at times substantially zero space current, and means in another of said paths and responsive to an impressed wave to establish said space current.

21. A signaling system comprising a vacuum tube having an anode, a cathode, and a control electrode, a source of direct current potential for supplying space current to said tube, a plurality of shunt paths between said control electrode and said cathode, an incoming signaling line, means for impressing signals from said line upon one of said shunt paths, means for causing said tube to be subtantially inoperative in the absence of received signals from said line, and means responsive to an impressed wave for rendering said tube operative.

22. A high frequency signaling system comprising a source of ultra-audio oscillations, a vacuum tube having input and output electrodes, two shunt paths about said input electrodes, means included in one of said shunt paths for impressing said oscillations upon said input electrodes, a movable contact in the other of said shunt paths, and electromagnetic means for controlling said movable contact in accordance with telegraph signals.

23. The method of modulating high frequency impulses in accordance with low frequency signal impulses, which comprises impressing the high and low frequency impulses upon the input circuit of a thermionic device whereby the space current thereof is varied, and reducing substantially to zero said space current when said low frequency impulses are not impressed on said device.

24. A signal transmission system comprising an electric discharge relay having a cathode, an anode and an impedance control element, a source of space current permanently connected to said cathode and anode to supply space current therebetween, an input circuit for said relay upon which waves to be repeated may be impressed, an output circuit for said relay from which repeated waves may be derived, means for maintaining said control element at such potential with respect to said cathode as to reduce the space current to a very small magnitude, and a circuit closer associated therewith to abruptly change said potential and permit the space current to increase in magnitude whereby the repeating operation of said relay from said input circuit to said output circuit may be abruptly controlled.

In witness whereof, I hereunto subscribe my name this 2nd day of February, 1918.

EDWIN H. COLPITTS.